July 5, 1966  H. R. PERSON  3,259,781
METHOD OF AND MEANS FOR DISTRIBUTING THE ELECTRICAL
FIELD AROUND THE BUSHING OF LIGHTNING ARRESTORS
Filed July 25, 1961

INVENTOR
HERMAN R. PERSON
BY
Talbert Dick & Barley
ATTORNEYS

WITNESS
FRED BAUGUS

3,259,781
METHOD OF AND MEANS FOR DISTRIBUTING THE ELECTRICAL FIELD AROUND THE BUSHING OF LIGHTNING ARRESTORS
Herman R. Person, Columbus, Nebr., assignor to Dale Electronics, Inc., Columbus, Nebr.
Filed July 25, 1961, Ser. No. 126,541
7 Claims. (Cl. 313—243)

This invention relates to a method of and means for distributing the electrical field around the insulated bushing of lightning arrestors, and more particularly to lightning arrestors used in aircraft.

It is not uncommon for lightning to strike aircraft in flight. Usually neither the aircraft, per se, nor the personnel are seriously harmed. However, it is quite common for expensive electronic equipment, such as radio, radar, electrical controls, and like, to be badly damaged by lightning. Not only are such losses costly, but the aircraft is deprived of their usage until they are repaired or replaced.

A well known aircraft lightning arrestor is disclosed in my issued United States Patent No. 2,916,667 published on December 8, 1959. It is to such or similar lightning arrestors that I apply my technique of properly distributing the electral field around the lightning arrestor bushing.

Therefore, one of the principal objects of my invention is to provide a metallic conductive electrical path around the bushing so that the conductive path would not be burned up by the high intensity arc.

More specifically the object of this invention is to provide metallic resistive material connections to highly conductive metallic material bands on the inner side of the glass container, housing the lightning arrestor.

A further object is to distribute the electric field outside the lightning arrestor core so that the bushing will take a great amount of voltage without arcing across it.

A still further object of this invention is to provide a metal film that will take the required power developed across it during transmission.

Still further objects of my invention are to provide a means for distributing the electrical field around the bushing of a lightning arrestor that is economical in manufacture and durable in use.

These and other objects will be apparent to those skilled in the art.

Figure 1:
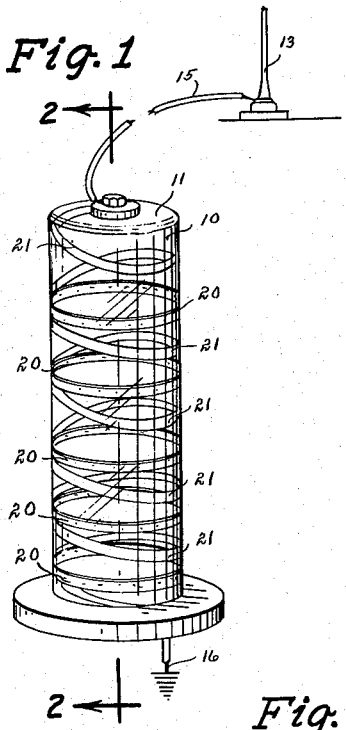
Figure 2:
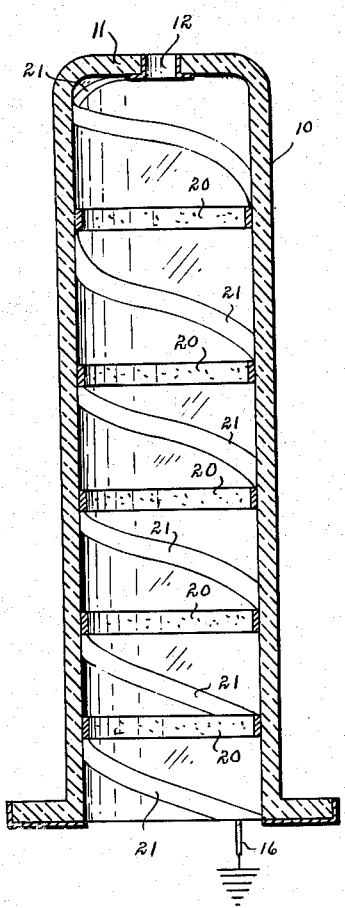
Figure 3:
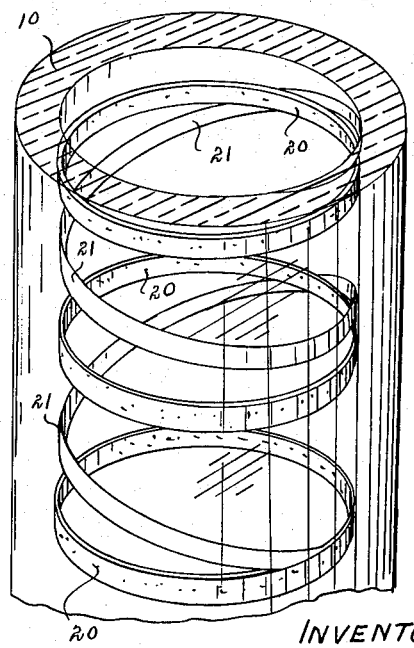

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a perspective view of the insulation bushing or housing of a lightning arrestor using my invention, FIG. 2 is an enlarged vertical sectional view of my treated bushing taken on line 2—2 of FIG. 1, and FIG. 3 is an enlarged perspective view of the upper portion of my treated lightning arrestor bushing and more fully illustrates its construction.

As before indicated this invention is applied to a lightning arrestor having an insulation bushing or housing around its core such as disclosed in the herebefore referred to Patent No. 2,916,667.

The bushing is designated in general by the numeral 10, is of cylindrical shape and has a top 11, and a metallic eye 12 through its top center. The numeral 13 designates an antenna or like having a lead wire 15 that operatively extends into the bushing 10 and makes electrical contact with the metallic eye 12, through which it passes. This lead communicates with the inside core (not shown) of the lightning arrestor. The numeral 16 designates the ground lead. Normally the insulation bushing or housing 10 is of glass and it loosely embraces the core of the lightning arrestor.

It is to such a bushing or housing that I apply my invention and which I will now describe in detail. Instead of using a carbon film on the inner side of the bushing 10 as a conductive path, I use a path system of two different materials plated on the inner side of the glass bushing or housing. The reason I use a plated metallic path instead of a carbon film is that carbon would be burned up immediately in case of a lightning strike. With a metal plating for a conductive path, the same would not be burned up in case of a lightning strike and transmission would therefore still be possible.

Furthermore, a metallic path would always permit the required power for a transmitter regardless of the condition of the core of the lightning arrestor. To accomplish my purpose I provide on the inner side of the bushing 10, a plurality of spaced apart transverse rings 20, of a high electricity conductivity material such as silver, aluminum or like. These rings 20 are electrically connected together by a spirally arranged longitudinal ribbon 21 on the inner side of the bushing 10, as shown in FIG. 2. This ribbon 21 has its upper end operatively electrically connected to the lead in wire from and to the antenna, and its bottom operatively electrically connected to the ground, or electrical instrument. As shown in FIG. 3, the spiral ribbon 21 is interposed by the spaced bands 20. The material used for the ribbon 21 should be of a metallic material having evaporatable electrical resistive characteristics such as chromium alloy, chromium nickel alloy, or like.

The two metallic ribbon paths 20 and 21 may be applied onto the interior of the bushing in any suitable means. However, I recommend that they be plated onto the glass surface of the bushing or housing 10.

Some changes may be made in the construction and arrangement of my method of and means for distributing the electrical field around the bushing of lightning arrestors without departing from the real spirit and purpose of my invention, and it is my intention to cover by my claims, any modified forms of structure or use of mechanical equivalents which may be reasonably included within their scope.

I claim:
1. In a bushing device for lightning arrestors,
   a hollow vertical housing of non-electro conducting material and being substantially cylindrical in shape,
   a plurality of spaced apart horizontal bands of high-electro-conductive material mounted on the inner side of said housing,
   a helical ribbon means of low electro-conductive material vertically disposed on the inner side of said housing and electrically connecting said spaced apart bands,
   means for electrically connecting one end of said ribbon means to an electrical ground,
   and means for connecting the other end of said ribbon means to an antenna element;
   said bands and ribbon means being metallic and being plated on the inner wall of said housing.
2. In a bushing device for lightning arrestors,
   a hollow vertical housing of non-electro conducting material and being substantially cylindrical in shape,
   a plurality of spaced apart horizontal bands of high-electro-conductive material mounted on the inner side of said housing,
   a helical ribbon means of low electro-conductive material vertically disposed on the inner side of said housing and electrically connecting said spaced apart bands,
   means for electrically connecting one end of said ribbon means to an electrical ground, and means for connecting the other end of said ribbon means to an antenna element;

said bands and ribbon means being metallic and being plated on the inner wall of said housing;

said bands and ribbon means being of different metallic material having different resistance values to the passage of electricity.

3. In a bushing device for lightning arrestors, a hollow vertical housing of non-electro conducting material and being substantially cylindrical in shape, a plurality of spaced apart horizontal bands of high-electro-conductive material mounted on the inner side of said housing, a helical ribbon means of low electro-conductive material vertically disposed on the inner side of said housing and electrically connecting said spaced apart bands, means for electrically connecting one end of said ribbon means to an electrical ground, and means for connecting the other end of said ribbon means to an antenna element;

said bands being a silver coating and said ribbon means being a coating of chromium alloy.

4. In a bushing device for lightning arrestors, a hollow vertical housing of non-electro conducting material and being substantially cylindrical in shape, a plurality of spaced apart horizontal bands of high-electro-conductive material mounted on the inner side of said housing, a helical ribbon means of low electro-conductive material vertically disposed on the inner side of said housing and electrically connecting said spaced apart bands, means for electrically connecting one end of said ribbon means to an electrical ground, and means for connecting the other end of said ribbon means to an antenna element;

said ribbon means being of a vaporable metallic coating.

5. In a bushing device for lightning arrestors, a hollow vertical housing of non-electroconducting material and being substantially cylindrical in shape, a plurality of spaced apart horizontal bands of high electro-conductive material mounted on the inner side of said housing, said bands being circular in shape and extending around the inner periphery of said housing, a helical ribbon means of low electro-conductive material vertically disposed on the inner side of said housing and electrically connecting said spaced apart bands, means for electrically connecting one end of said ribbon means to an electrical ground, and means for connecting the other end of said ribbon means to an antenna element.

6. In a bushing device for lightning arrestors, a hollow vertical housing of non-electro conducting material and being substantially cylindrical in shape, a plurality of spaced apart horizontal bands mounted on the inner side of said housing, a spirally disposed ribbon means vertically disposed on the inner side of said housing and electrically connecting said spaced apart bands, the material of said bands and said ribbon having different electro-conducting capacities, means for electrically connecting one end of said ribbon means to an electrical ground, and means for connecting the other end of said ribbon means to an electrical ground.

7. The device of claim 6 wherein said ribbon means is of a vaporable metallic coating, and said bands are of a highly conductive metal substance.

References Cited by the Examiner

UNITED STATES PATENTS

| | | | |
|---|---|---|---|
| 1,509,609 | 9/1924 | Pfifner | 317—66 X |
| 2,569,154 | 9/1951 | Donath | 315—41 X |
| 2,982,494 | 5/1961 | Amason | 317—2 X |

GEORGE N. WESTBY, *Primary Examiner.*

C. R. CAMPBELL, S. SCHLOSSER,
*Assistant Examiners.*